(12) United States Patent
Klatt et al.

(10) Patent No.: US 8,818,386 B2
(45) Date of Patent: Aug. 26, 2014

(54) METHOD AND PROGRAM FOR CHANNEL MODIFICATION IN A CELL OF A MOBILE RADIO ACCESS NETWORK

(75) Inventors: Axel Klatt, Cologne (DE); Markus Breitbach, Bonn (DE)

(73) Assignee: Deutsche Telekom AG, Bonn (DE)

( * ) Notice: Subject to any disclaimer, the term of this patent is extended or adjusted under 35 U.S.C. 154(b) by 83 days.

(21) Appl. No.: 13/380,139

(22) PCT Filed: Jun. 15, 2010

(86) PCT No.: PCT/EP2010/003581
§ 371 (c)(1),
(2), (4) Date: Dec. 22, 2011

(87) PCT Pub. No.: WO2010/149293
PCT Pub. Date: Dec. 29, 2010

(65) Prior Publication Data
US 2012/0100863 A1    Apr. 26, 2012

Related U.S. Application Data

(60) Provisional application No. 61/220,960, filed on Jun. 26, 2009.

(30) Foreign Application Priority Data

Jun. 26, 2009    (EP) ..................................... 09008390

(51) Int. Cl.
*H04W 72/04*    (2009.01)
*H04W 52/02*    (2009.01)
*H04W 84/04*    (2009.01)

(52) U.S. Cl.
CPC ........ *H04W 72/042* (2013.01); *H04W 52/0229* (2013.01); *H04W 84/045* (2013.01)
USPC ............................. 455/450; 455/446; 370/338

(58) Field of Classification Search
USPC .......... 455/446, 450, 422, 509; 370/328, 329, 370/338, 350
See application file for complete search history.

(56) References Cited

U.S. PATENT DOCUMENTS 5,546,443 A    8/1996    Raith
5,910,949 A *  6/1999    Bilstrom et al. .............. 370/337
(Continued)

FOREIGN PATENT DOCUMENTS

CN    1848991 A    10/2006
CN    101052205 A    10/2007
(Continued)

OTHER PUBLICATIONS

FemtoForum, "Progress Report: Femto Cell Deployment Impacts on UE Battery Life," p. 1-43, May 28, 2009.

(Continued)

*Primary Examiner* — Cong Tran
(74) *Attorney, Agent, or Firm* — Leydig, Voit & Mayer, Ltd.

(57) ABSTRACT

A method is provided for channel modification within a macro cell of a cellular mobile radio access network. The method includes the steps of: providing a first control channel signal transmitted by a first transmitter, wherein the macro cell comprises the first transmitter and the macro cell overlaps at least partly with a radio coverage area created by a second transmitter; and providing a second control channel signal transmitted by the second transmitter, wherein the second control channel signal is transmitted using a same physical layer configuration as the first control channel signal. The second control channel signal is synchronized to the first control channel signal. The second control channel signal includes a duplication of the first control channel signal. The second control channel signal differs from the first control channel signal in at least one information element carried by the first control channel signal.

19 Claims, 2 Drawing Sheets

(56) References Cited

U.S. PATENT DOCUMENTS

| | | | |
|---|---|---|---|
| 6,490,461 B1* | 12/2002 | Muller | 455/522 |
| 6,628,946 B1 | 9/2003 | Wiberg et al. | |
| 7,768,983 B2* | 8/2010 | Nylander et al. | 370/338 |
| 8,478,236 B2* | 7/2013 | Chen et al. | 455/410 |
| 2008/0039094 A1* | 2/2008 | Jeong et al. | 455/436 |
| 2008/0076419 A1 | 3/2008 | Khetawat et al. | |
| 2009/0092122 A1 | 4/2009 | Czaja et al. | |
| 2009/0247157 A1* | 10/2009 | Yoon et al. | 455/434 |
| 2009/0274086 A1 | 11/2009 | Petrovic et al. | |
| 2009/0305741 A1* | 12/2009 | Takeuchi et al. | 455/561 |
| 2010/0080160 A1 | 4/2010 | Kazmi et al. | |
| 2010/0210273 A1* | 8/2010 | Jun et al. | 455/450 |
| 2010/0311427 A1* | 12/2010 | Bouguen et al. | 455/446 |
| 2011/0045817 A1 | 2/2011 | Touset et al. | |
| 2011/0081914 A1* | 4/2011 | Lin et al. | 455/450 |
| 2012/0063403 A1* | 3/2012 | Moon et al. | 370/329 |

FOREIGN PATENT DOCUMENTS

| | | |
|---|---|---|
| EP | 1909523 A1 | 4/2008 |
| WO | WO 0072609 A1 | 11/2000 |
| WO | WO 2008046939 A1 | 4/2008 |
| WO | WO 2008052625 A1 | 5/2008 |

OTHER PUBLICATIONS

3rd Generation Partnership Project, Radio Resource Control (RRC) Services provided to upper layers; (Release 8) 3GPP TS 25.331, Ch. 5.2, p. 43, 2007.

3rd Generation Partnership Project; Technical Specification Group Radio Access Network; Evolved Universal Terrestrial Radio Access (E-UTRA);User Equipment (UE) procedures in idle mode, (Release 8) 3GPP TS 36.304, Ch. 5.2.4.8, p. 23, 2009.

European Patent Office, International Search Report in International Patent Application No. PCT/EP2010/003581 (Oct. 20, 2010).

European Patent Office Examination Report in European Patent Application No. 09008390 (Dec. 17, 2009).

* cited by examiner

METHOD AND PROGRAM FOR CHANNEL MODIFICATION IN A CELL OF A MOBILE RADIO ACCESS NETWORK

CROSS-REFERENCE TO RELATED APPLICATIONS

This patent application is a national stage entry under 35 U.S.C. §371 of International Application No. PCT/EP2010/003581, filed Jun. 15, 2010, and claims priority to European Patent Application No. EP09008390.8, filed Jun. 26, 2009, and U.S. Provisional Patent Application No. 61/220,960, filed Jun. 26, 2009. The International Application was published in English on Dec. 29, 2010, as WO 2010/149293 A1.

FIELD

The present invention relates to a method and a program for channel modification in a cell of a cellular mobile radio access network, especially a UMTS or LTE mobile radio access network, wherein the macro cell has a first transmitter and wherein the macro cell overlaps at least partly with a femto cell having a second transmitter.

BACKGROUND

Cellular mobile radio networks like GSM, UMTS, LTE, cdma2000 include a multitude of radio cells. A radio cell is the geographic area of the cellular mobile network in which the radio signal transmitted by a base station can be received. Generally two types of radio cells can be distinguished: Macro cells and Femto cells.

Macro cells achieve a radius of several hundred meters or more and usually serve both outdoor and indoor locations with open access to any subscriber registered to the cellular network. Macro base stations are typically owned, installed and operated by the Mobile Network Operators.

Femto cells usually serve indoor locations and cover smaller areas compared to the macro cells, such as in trains, aircrafts, ferries and building, like offices, private houses, shopping malls, train stations, airports and the like. Femto base stations are installed on the mobile radio customers' premises and can be owned by the customers. Access to a femto cell is typically under control of its owner and will be restricted usually to a small group of subscribers. Femto cells operating without user access limitation are also referred to as pico cells. An example of a Femto cell is disclosed in US Patent Publication No. 2009/0092122 A1.

In all radio cells of a cellular network, a set of common channels is broadcast by the base station. These common channels include e.g. synchronization channel, pilot channel, broadcast channel and paging channel. Depending on the specific radio technology further common channels may exist, but the mentioned channels are typical for each on the mentioned cellular radio systems.

SUMMARY

In an embodiment, the present invention provides a method for channel modification within a macro cell of a cellular mobile radio access network. The method includes the steps of: providing a first control channel signal transmitted by a first transmitter, wherein the macro cell comprises the first transmitter and the macro cell overlaps at least partly with a radio coverage area created by a second transmitter; and providing a second control channel signal transmitted by the second transmitter, wherein the second control channel signal is transmitted using a same physical layer configuration as the first control channel signal. The second control channel signal is synchronized to the first control channel signal. The second control channel signal includes a duplication of the first control channel signal. The second control channel signal differs from the first control channel signal in at least one information element carried by the first control channel signal.

DETAILED DESCRIPTION

Figure 1:
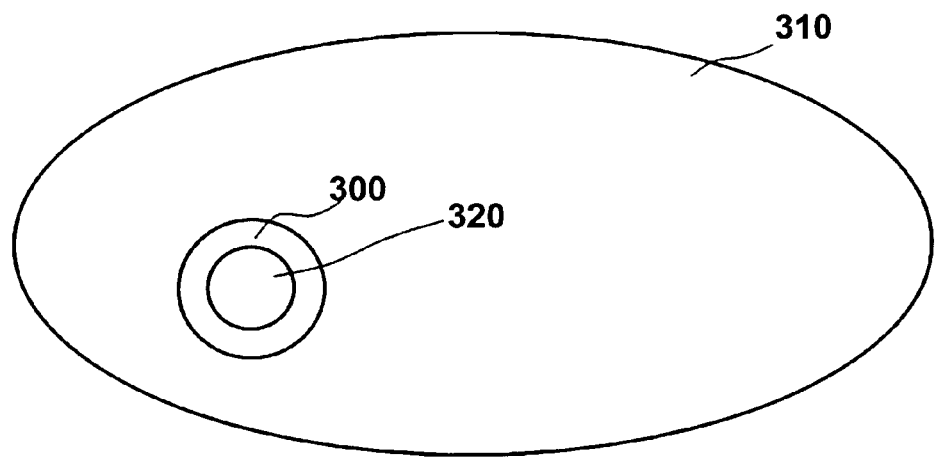
FIG. 1 illustrates schematically a macro cell of a mobile radio access network and a femto cell embedded into the macro cell according to a method according to first and second exemplary embodiments of the present invention.

In embodiments of the present invention, a method and a program are provided for channel modification in a macro cell of a cellular mobile radio access network, e.g. a UMTS or LTE mobile radio access network, that allows a modification of at least parts of common or broadcast channel information locally in a geographical part of the macro cell.

In an embodiment, a method is provided for channel modification in a macro cell of a cellular mobile radio access network, e.g. a UMTS (Universal Mobile Telecommunications System) or LTE (Long Term Evolution) mobile radio access network, wherein the macro cell has a first transmitter and the macro cell overlapping at least partly with a radio coverage area created by a second transmitter, the method including the steps of providing a first control channel signal transmitted by the first transmitter and providing a second control channel signal transmitted by the second transmitter, wherein the second control channel signal is a duplication of the first control channel signal except for at least one information element of the first control channel signal. According to an embodiment, the second control channel signal is transmitted by using the same physical layer configuration as the first control channel signal, especially the same frequency, scrambling codes and channelisation codes, wherein the second control channel signal is synchronized to the first control channel signal, and wherein the second control channel signal is a duplication of the first control channel signal but differs from the first control channel signal in at least one information element carried by the first control channel signal. The information element (being part of the information transported via the control channel) is different between the first and second control channel signal (or is changed in the second control channel signal compared to the first control channel signal), i.e. such an information element may be a piece of information related to a Radio Resource Control parameter and not related to the parameters defining the configuration of the physical layer of the radio interface like frequency, scrambling code or channelization code.

In an embodiment, it is advantageously possible that the first control channel signal of the macro cell is duplicated, wherein merely the at least one information element of the first control channel signal is modified. In this context, "duplication" means that the second control channel signal is transmitted by using the same physical layer configuration parameters, in particular carrier frequency and scrambling and channelization codes as the first control channel signal, wherein the second control channel signal is synchronized to the first control channel signal. Without the modification of the at least one information element, the first control channel signal and the second control channel signal would be completely identical. User equipment (UE), for example a cellular phone, used in the macro cell beyond the femto cell and tuned to the physical layer configuration parameters of the macro cell receives the instructions of the first control channel signal, whereas a user equipment located within the femto cell is tuned to the same physical layer configuration parameters of the macro cell, but receives the second control channel signal including the at least one modified information element. As a result of the duplication, the user equipment located within the femto cell will proceed with the second control channel signal as if the second control channel signal comes from the macro cell, because the user equipment is tuned to the physical layer configuration parameters of the macro cell and is therefore not capable of differentiating if the first or the second transmitter broadcasts the second control channel signal. Consequently, it is advantageously possible to modify certain information elements or certain groups of information elements carried by a control channel signal of a macro cell for the purposes of a certain femto cell overlapping the macro cell. It enables for example the usage of differentiated parameterization or network configurations in geographical parts of said macro cell. The radio coverage area created by the second transmitter is, e.g., the radio coverage area of a femto cell or a radio coverage area of a transmitter (second transmitter) that is assigned to one or a plurality of femto cells. Hereinafter, an exemplary embodiment is described with the second transmitter being part of the femto cell.

In an embodiment, the information carried on common or broadcast channels that are broadcast by a mobile radio base station are completely or partly modified in a restricted area of the macro cell by synchronous transmission from another transmitter within the macro cell. Thereby the mobile UEs in the reception area of this transmitter can be forced to operate with a different set of information elements in contrast to the cell specific information elements broadcast by the macro cell. Additionally, mobile UEs under the reception area of such a transmitter can follow different procedures than specified by the information elements defined by the common channels (e.g. the broadcast channel) of the radio base station of the macro cell although they are served by the macro radio base station with any information not modified by the base station used for local modification of information elements or for the channels which are not broadcast by this base station (namely the traffic channels of the macro cell).

In an embodiment, it is advantageous that the femto cells, in particular UMTS or LTE femto cells, are accessible to user equipment that do not support the Closed Subscriber Group (CSG) feature specified in 3GPP Release 8.

The RRC parameter "Sintersearch" is a particular information element carried by the broadcast control channel (BCCH) of a UMTS radio access system. By appropriately modifying the setting of the RRC parameter "Sintersearch", UMTS UEs can be forced to permanently look for femto cells only in parts of a given macro cell in contrast to conventional systems where the configuration to search for another cell, e.g. on another frequency (the femto frequency) is only configurable within the entire geographical area of a cell belonging to a cellular network. Conventionally, the only possibility to enable a search was an RRC parameterisation of the macro cell that forces the UE anywhere in the macro cell to search for such femto cells on a different frequency layer. This ensures that a UE will always find its owner's femto cell, at the drawback of higher processing effort and reduced battery lifetime, as described in FemtoForum, "Progress Report: Femto Cell Deployment Impacts on UE Battery Life," 28 May 2009.

For the application with mobility towards a "2nd frequency layer femto cell", an embodiment of the present invention overcomes this problem by modifying an information element, e.g. this RRC parameter (Sintersearch), locally in the selected area of the macro cell which is covered by a femto cell (on another frequency, i.e. the second frequency of the femto cell which is different to the frequency of the macro cell and which is hereinafter also called fourth frequency) and where customers should preferably move to the femto cell rather than remaining on the macro cell. Therefore and in the case that the information element (by which the second control channel signal differs from the first control channel signal) is the RRC parameter "Sintersearch", the value of the RRC parameter "Sintersearch" (e.g. provided in SIB3) of the broadcast control channel (BCCH) may be modified in such a manner, that the value of the RRC parameter "Sintersearch" of the second control channel signal is higher compared to the setting of the RRC parameter "Sintersearch" of the first control channel signal.

Embodiments of the present invention have several advantages, including but not limited to being applicable for all legacy UMTS UEs prior to 3GPP Rel-8 (and the Rel-8 UMTS UEs not implementing the CSG feature).

Without modification of the RRC parameter Sintersearch to a high value (to enable that UEs preferably try to camp on femto cells), the deployment of UMTS femto cells with closed access is substantially only usable in locations with bad UMTS macro cell coverage in order to avoid the above mentioned drawbacks, like reduced battery lifetime in all UEs (prior to 3GPPP Rel-8), for instance. Hence the use of UMTS femto cells has mainly been limited to coverage extension for the macro network. By the invention disclosed here, UMTS femto cells can be installed everywhere, independently of the signal strength of the macro network. Thereby the limitation in applications for UMTS femto cells is removed, and in particular the use of femto-specific services is enabled.

In an embodiment, it is advantageously possibly that UEs can detect UMTS femto cells without modification of the RRC parameter Sintersearch in the macro cells. Thereby the drawbacks of this RRC parameter modification, in particular battery drain of all UEs (prior to 3GPP Rel-8) are avoided. The femto cell has no impact on ongoing connections, when a UE is moving into or out of the femto cell's coverage area.

In the vicinity of the femto cell, UEs that are not admitted to access the femto cell are still reachable via the macro cell. Reachability is ensured without carrying any user traffic or control traffic over the femto base station's backhaul connection (typically a DSL line). The latter is typically not possible everywhere due to regulatory or commercial obligations. The femto base station does not need to be realised as a "dual carrier" femto basestation where the second carrier provides the femto as such (closed access) and the additional first carrier cell the open access. Such basestations are sometimes referred as "hybrid".

Embodiments of the present invention are also applicable in combination with Rel-8 CSG concept of either UMTS or LTE to provide a fall back solution in any of the cases where the UE autonomous search for allowed CSG cells does not work.

In an embodiment, an information element carried by the paging channel (PCH) is modified in the second control channel signal compared to the first control channel signal, wherein the UE detects the Paging Type 1 message with the RRC IE "BCCH modification info". This information triggers the user equipment to read at least the RRC parameter "Sintersearch" of the broadcast control channel (BCCH) again. Consequently, the user equipment identifies an increased value of the RRC parameter "Sintersearch". As a result of the increased value of RRC parameter "Sintersearch", the user equipment is forced to search for femto cells on different carrier frequencies in the service area of the second control channel signal, for instance.

Alternatively or cumulatively, the modification of the information carried on the broadcast channel of a UMTS radio access system may also include a change of the cell identity information of the macro cell. Advantageously, a changing of the cell identity information triggers the user equipment to read out the parameters of the whole broadcast channel (BCCH) again. Consequently, the user equipment is capable of identifying a modified RRC parameter "Sintersearch".

In an embodiment, the transmission of the second control channel signal is temporarily and/or repeatedly interrupted. As a result, the user equipment in the service area of the femto cell is capable of receiving incoming calls via the macro cell. Therefore, in an embodiment, the first transmitter is configured to repeat paging transmission sequentially in such a manner that the retransmission cycles of the macro cells are provided during the interruptions of the second control channel signal.

In an embodiment, a first carrier frequency is used for the transmission of the first and the second control channel signal, and a second carrier frequency is used for the transmission of a third and a fourth control channel signal. The third control channel signal is a control channel signal of a second macro cell that is, e.g., in the vicinity of the femto cell. For example, the femto cell is in an overlapping region of the first macro cell and the second macro cell. Analogously to the relationship between the first control channel signal and the second control channel signal, the fourth control channel signal is a duplication of a third control channel signal used within the second macro cell, i.e. the fourth control channel signal is transmitted by using the same physical layer configuration as the third control channel signal, especially the same frequency, scrambling codes and channelization codes, wherein the fourth control channel signal is synchronized to the third control channel signal, wherein the fourth control channel signal is a duplication of the third control channel signal but differs from the third control channel signal in at least one information element carried by the third control channel signal. Alternatively to the transmission of the second (as well as the first) control channel signal on the first carrier frequency (of the first macro cell) and the transmission of the fourth (as well as the third) control channel signal on the second carrier frequency (of the second macro cell), in another embodiment, for the transmission of the second control channel signal the first carrier frequency is used and for the transmission of the fourth control channel signal also the first carrier frequency is used. Thus, any user equipment operating on any carrier frequency of the first and second macro cells can be instructed to search for femto cells and subsequently can be directed towards the carrier frequency of the identified femto cell. In an embodiment, the second and fourth control channel signals are broadcast sequentially, so that merely one antenna may be used for transmitting the second and fourth control channel signals.

These and other characteristics, features and advantages of the present invention will become apparent from the following detailed description, taken in conjunction with the accompanying drawings, which illustrate, by way of example, the principles of exemplary embodiment of the present invention. The description is given for the sake of example only, without limiting the scope of the invention. The reference figures quoted below refer to the attached drawings.

The present invention will be described with respect to particular exemplary embodiments and with reference to certain drawings, but it will be appreciated that the invention is not limited thereto, but only by the claims. The drawings described are merely exemplary and are non-limiting. In the drawings, the size of some of the elements may be exaggerated and not drawn on scale for illustrative purposes.

Where an indefinite or definite article is used when referring to a singular noun, e.g. "a", "an", "the", this includes a plural of that noun unless something else is specifically stated.

Furthermore, the terms first, second, third and the like in the description and in the claims are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The problem of finding a UMTS femto cell with a mobile UE that does not support the CSG functionality of 3GPP Rel-8 is described as follows.

CSG functionality as defined by 3GPP refers to a concept for improved interworking of mobile UEs in a cellular network with closed femto cells (typically deployed in private premises) where access rights only exists for a limited number of subscribers (e.g. the members of a family). In addition to this closed access approach, 3GPP Rel-8 concept for CSG is based around a UE autonomous search for usable femtos in contrast to the current need for network guidance to search for other target cells while camped on a given serving cell. The so-called "cell reselection process" is well known for cellular networks and for UMTS for example described in 3GPP TS 25.331 chapter 5.2. Furthermore in 3GPP releases prior to Rel-8, all radio cells were assumed to be accessible in principle for any subscriber registered with a certain mobile network, and no mechanism was foreseen to detect and access so-called "closed radio cells" which may be accessed only by a restricted group of authorised subscribers of the plurality of subscriber of a given mobile network. The main driver of a decision to change between cells of a cellular network has always been the need to stay connected to the best cell from radio condition point of view. With the introduction of closed femto cells that are owned, installed and operated by the mobile radio customer, instead of by the Mobile Network Operator, a need arose for a mechanism to detect and access "closed radio cells."

In a deployment scenario where the femto cells and the macro cells share the same frequency (e.g., in reuse-1-systems like UMTS, LTE, cdma2000 or WiMAX), in the vicinity of such a closed femto cell, the signal from the macro cell is interfered by the femto cell (operating on the same frequency although typically with low power), and an unauthorised subscriber cannot be served by the macro cell. A common approach to overcome this problem is to deploy macro cells and femto cells on separate carrier frequencies.

When a UE is camping on a macro cell with carrier frequency f1 and moves into the coverage area of the femto cell on carrier frequency f2 (hereinafter also called femto frequency), a procedure is needed by which the UE can detect the femto cell. In UMTS, such procedure is the cell reselection procedure defined in 3GPP TS 25.304, Chapter 5.2. Originally it was intended to find a new serving cell if the signal strength of the current serving cell is not sufficient to ensure acceptable service quality. Whenever the signal strength of the current cell's pilot signal drops below a certain threshold, the UE starts to search on a second frequency f2 for other radio cells as potential target cell to change to. The threshold value can be configured by the RRC parameter "Sintersearch", which is broadcast on the broadcast channel of the current serving cell (here the macro cell), as described in 3GPP TS 25.304, Chapter 5.2.6.1.5.

A high value for Sintersearch results in a very high threshold value, making it likely for the UE to perform measurements. In a typical case the signal strength of the macro cells will fall below this threshold everywhere in the radio cell, so that all UEs are required to be permanently searching for femto cells in the entire area of the macro cell more of less independently of the macro cells serving quality. While this ensures that a customer will be able to find his own femto cell, it has the significant drawback that the permanent processing for femto cell search consumes battery power. Even worse, this drawback affects all UEs in the macro network, not only those UEs that are permitted to access a femto cell. In order to promote UEs to preferably try to camp on femto cells, pre-Rel-8 solutions for UMTS do not allow for other solutions than a high Sintersearch value.

To overcome the problem stated above, in 3GPP Rel-8 the "Closed Subscriber Group" (CSG) concept has been introduced as described in 3GPP TS 36.304, Chapter 5.2.4.8. It mainly includes two features in contrast to the previously described solution for pre-Rel-8 UEs:

The UE maintains a whitelist of femto cells that it is permitted to access ("allowed CSG ID list"). When the UE detects a femto cell, it reads the femto cell's CSG ID from the broadcast channel. Only if the cell's CSG ID is contained on the list of allowed femto cells (the allowed CSG ID list), the UE attempts to change to the identified femto cell triggers a Location Area Update (LAU) procedure to access the femto cell.

The "UE autonomous search for CSG cells" means that a UE itself determines its geographical position in the cellular network. This can be done e.g. based on the cell IDs of the macro network, GPS information or any other means. Details for the determination are not standardized and will be optimised depending on the implementation and over time. If and only if the UE detects that it is in the vicinity of a femto cell that it may access because it has already obtained the right to use such a CSG cell as the CSG ID is part of the "allowed CSG ID list", the UE starts searching for this femto cell. This avoids that the UE wastes battery power on useless femto cell searching in most of the part of the network where chances to find a usable femtos cell do not exist. It also allows only the UE which intends to find a femto cell to perform such a search and not require the macro network to use a parameterisation which forces all terminals in the entire cell area of the macro cell to search for femto cells permanently.

This concept effectively solves the problem for UEs that support the CSG concept. A configuration of the macro cells of a mobile network in a way that forces UEs in large areas of or the entire PLMN to perform search and measurements of femtos cells on another, i.e. femto frequency, can be avoided. This provides an efficient means to avoid the additional battery consumption for all UE on the macro cells. However the majority of UMTS UEs will not support this concept in the next few years, because this concept is optional in UMTS Rel-8 and not supported by legacy pre-Rel-8 UMTS UEs at all.

Therefore, embodiments of the present invention provide a solution that enables legacy terminals to find femto cells while avoiding the negative impact on battery consumption introduced by the unnecessary searches for femto cells on a different carrier than the current serving macro one.

In the following description, two exemplary embodiments of the present invention are described that provide a solution for the problem of UMTS femto base stations described above. Both are based on the principle that a part or all of the information carried by common or broadcast channels that are broadcast by the macro base station are modified locally. The solutions of the two exemplary embodiments differ in the information or parameters that are modified locally. Further enhancements that may be applied in further embodiments are also described.

In FIG. 1, a macro cell 310 of a UMTS mobile radio access network and a femto cell 300 embedded into the macro cell 310 are illustrated. A first transmitter of the macro cell 310 broadcasts a first control channel signal 510 on a first carrier frequency 411. The femto cell 300 is provided on another carrier frequency, i.e. the femto frequency, broadcast by a second transmitter of the base station of the femto cell 300. According to an alternative embodiment of the present invention, the second transmitter can also be independent of the base station of the femto cell 300. The second transmitter further broadcasts a second control channel signal 520 on the first carrier frequency 411, wherein the second control channel signal 520 is obtained by duplicating the first control channel signal 510 except for certain information elements in the broadcast control channel (BCCH) 111 and/or in the paging channel (PCH) 112 of the first control channel signal 510. In particular, the value of the RRC parameter "Sintersearch" on the one hand, as well as the cell identity information or the value tag of the RRC information element "SIB3" on the other hand is hereby modified. The second control channel signal 520 is synchronized to the first control channel signal 510 and uses the same physical layer configuration, in particular the same scrambling and channelization codes, as the first control channel signal 510. The service range of the second control channel signal 520 is referred to as cloned cell 320 (as the second control channel signal 520 is a "clone" of the first control channel signal 510 except for the above mentioned information elements), hereinafter also called the radio coverage area of the second transmitter, i.e. the part of the femto cell 300 for which radio coverage of the second transmitter is sufficient.

In a first exemplary embodiment, a femto base station (including the second transmitter) is provided that can detect (the first control channel signal 510 of) a surrounding macro cell 310 ("sniffing") on the first carrier frequency 411 and can transmit simultaneously on the first frequency 411 and the other carrier frequency (i.e. the femto frequency), where the other carrier frequency is the frequency intended for the femto cell 300.

With the sniffing capability, the femto base station can read the macro cell's Scrambling Code (UMTS) and extract the information distributed on the macro cell's broadcast channel (BCCH 111, provided by the Primary Common Control Physical Channel (P-CCPCH)). Furthermore the femto base station can synchronize itself to the macro cell timing.

The second transmitter, which may be the femto base station, extracts the BCCH 111 information of the macro cell 310. Then it replaces the original, low value of the parameter Sintersearch provided in SIB3 of the BCCH 111 of the macro cell by a new, very high value, changes the parameter Value Tag for SIB3 in the scheduling block (SB) to a different value than the one of the macro cell 310 and thereby it creates a new BCCH 121 locally broadcast in only a subarea (cloned cell 320) of the macro cell 310. Furthermore the femto base station creates a Paging Channel (PCH 122, provided by the Secondary Common Control Physical Channel (S-CCPCH)) that carries only an "RRC: Paging Type 1" message with the information element "BCCH modification info" and uses the same paging channel configuration as the macro cell's PCH 112. Then the femto base station transmits the new BCCH 121 and the new PCH 122 via the second control channel signal 520 on the macro cell's first carrier frequency 411 (e.g. timewise) synchronously to the macro cell 310 on the same scrambling code as the macro cell 310 using also the same channelization codes as the macro cell 310.

Since the femto base station now transmits a "cloned" signal (the second control signal channel 520) of the macro cell's BCCH 111 (the first control signal channel 510) on the same first carrier frequency 411, scrambling code and channelization code as the macro cell 310 and timely synchronised to the macro cell 310, a UE receiving both the original signal (the first control signal channel 510) from the macro base station and the "cloned" signal (the second control signal channel 520) from the femto base station cannot distinguish between these first and second control channel signals 510, 520. Instead the UE receiver will combine both the first and second control channel signals 510, 520 in an additive manner (as if this is a multipath propagation).

Where the signal strength from the femto base station is low, the signal from the macro cell 310 will be dominant, and a UE will read the original BCCH 111 with the original Sintersearch parameter (low value). Accordingly there will be no change in UE behaviour at all if the UE is in an area of the macro cell 310 outside the area where the "cloned" signal (the second control signal channel 520) from the femto base station can be received. In turn the UE will not search for femto base stations and the additional power consumption resulting in battery drainage can be avoided.

In the femto cell 300, and especially in the cloned cell 320 (where a sufficient reception level of the femto base station is present), however, the "cloned" BCCH 121 and PCH 122 channels transmitted by the femto base station are stronger than their originals (from the macro cell 310). Since the second control channel signal 520 generated by the femto base station uses the same scrambling code and channelisation codes as the macro cell 310 and since it is properly synchronised to the macro cell 310, the UE cannot notice that this second control channel signal 520 is not the original macro cell first control channel signal 510. Instead the UE will receive the second control channel signal 520 from the femto base station and assume that this signal belongs to the macro cell 310.

In addition the UE reads the "cloned" PCH 122 and detects the Paging Type 1 message with the "BCCH modification info". It understands that some information on the BCCH has changed and therefore also reads the BCCH. Then it will read the new, high value of parameter Sintersearch from the "cloned" BCCH 121.

The new, high value for Sintersearch results in a threshold value higher than the signal strength of the pilot channel, and the UE starts searching for the femto cell 300 on the other carrier frequency, i.e. the femto frequency. As soon as the femto cell 300 is found, the UE changes to the other carrier frequency, i.e. the femto frequency, a LAU procedure is performed, and if the UE is permitted to access the femto cell 300, it is finally camped on the femto cell 300.

If the UE is not permitted, the femto cell 300 triggers a LAU Reject, and the UE is camped again on the macro cell 310 and remains camped here. Since only the BCCH and PCH of the macro cell 310 are modified in the vicinity of the femto base station, the UE can still be served by the macro cell 310. The only difference to the macro cell area outside the femto base station's coverage will be that the UE applies a modified Sintersearch parameter and thus is forced to search for femto cells 300 on the other carrier frequency (i.e. the femto frequency of the femto cell). After the initial LAU reject, typically UEs (at least newer ones) remember the LAU reject on a different frequency and avoid measuring that cell for a predetermined time interval, for example the next 300 seconds.

In a second exemplary embodiment of the method according to the present invention the femto cell 300 performs substantially the same steps as in the first embodiment of the present invention mentioned above, but instead of using the paging type 1 message to force the UE to read the BCCH of the femto cell 300 on the "cloned" BCCH 121 it modifies, in addition to the Sinterserach parameter, the cell identity of the macro cell 310. This also forces the UE to re-read the BCCH information and check the value tag of the SIB3 on entry in the area where the information from the macro cell's BCCH 111 is locally modified. In case of a different value tag for SIB3 it applies the modified Sintersearch parameter and proceeds with the steps as in the first embodiment.

Figure 2:
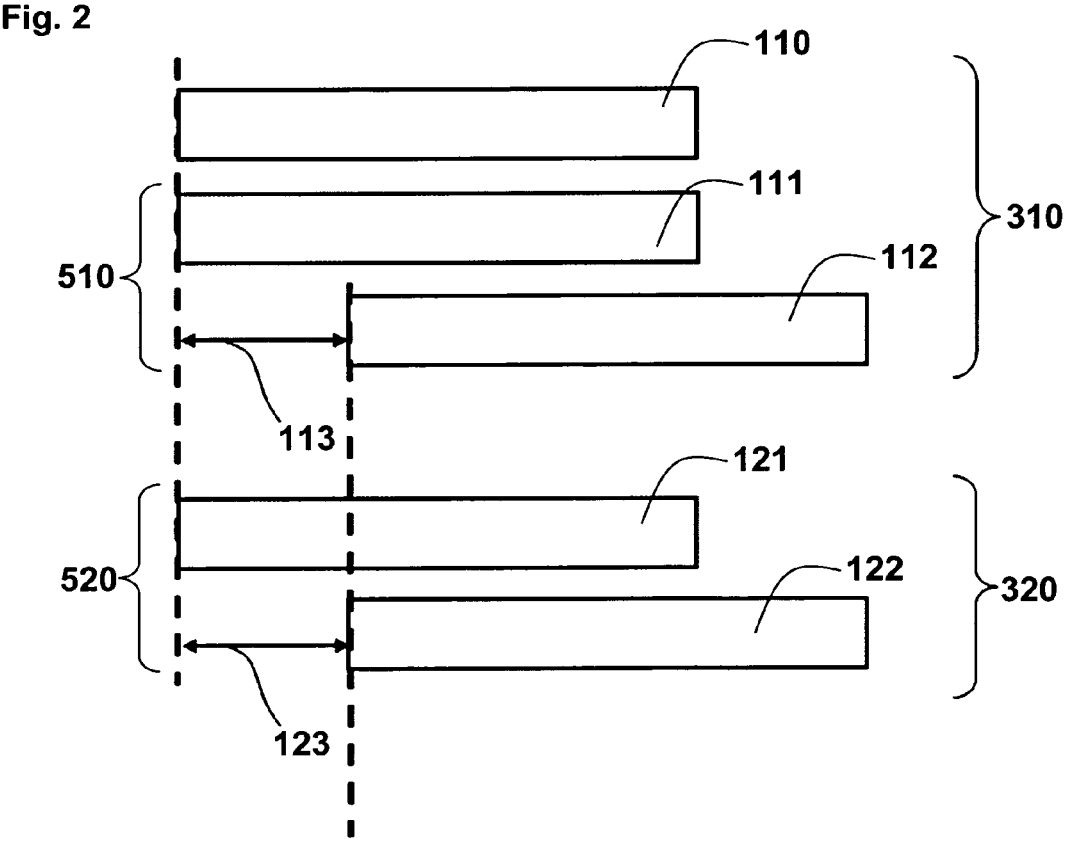
FIG. 2 illustrates schematically the timing of first and second control channel signals of a method according to the first and the second exemplary embodiments of the present invention.

In FIG. 2, the timing of the first and the second control channel signals 510, 520 according to the first and the second exemplary embodiments of the present invention are schematically illustrated, wherein the macro cell 310 broadcasts a pilot channel 110, a first broadcast control channel BCCH 111 and a first paging channel (PCH) 112 on a first carrier frequency 411 of the macro cell 310. In the femto base station the second control channel signal 520 is broadcasted synchronously to the first control channel signal 510, wherein a second broadcast control channel BCCH 121 of the second control channel signal 520 is generated by duplicating the first broadcast control channel 111, whereby the original, low value of the parameter Sintersearch provided in SIB3 of the first broadcast control channel is replaced by a new, very high value. This modification further changes the parameter Value Tag for SIB3 in the scheduling block (SB) to a different value than the one of the first broadcast control channel 111. Furthermore, the macro cell 310 broadcasts the first paging channel 112 which is time shifted with a first time delay 113 compared to the first broadcast control channel 111. A second paging channel 122 in the second control channel signal 520 is generated by duplicating the first paging channel 112 merely containing additionally an RRC: Paging Type 1 message with the information "BCCH modification info". The second paging channel 122 features a second time delay 123 compared to the second broadcast channel control 121, wherein the second time delay 123 is equal to the first time delay 113.

The above described first and second exemplary embodiments can be enhanced with additional features in further embodiments, as described in the following description.

In a further embodiment, it may be advantageous that the "cloned" PCH 122 is not transmitted permanently by the femto base station, but instead it is transmitted periodically with pauses between two subsequent transmissions.

While the femto base station is transmitting the "cloned PCH" 122, a UE in the vicinity of the femto base station might not be pagable by the macro cell 310 on the original PCH 112. As a consequence, this UE cannot receive incoming calls during transmission of the "cloned" PCH 122. However the macro cell 310 may be configured to repeat its paging transmissions on the original PCH 112 (paging repetition). In an embodiment, provided that the retransmission cycles in the macro cell 310 on the one hand and the durations of "cloned" PCH transmission and pauses in the femto base station on the other hand have been configured properly, a UE in the vicinity of the femto base station can still receive at least the transmission of the macro cell's paging. In this way, a UE that is not admitted to access the femto cell 300, is reachable even in the vicinity of the femto base station.

Figure 3:
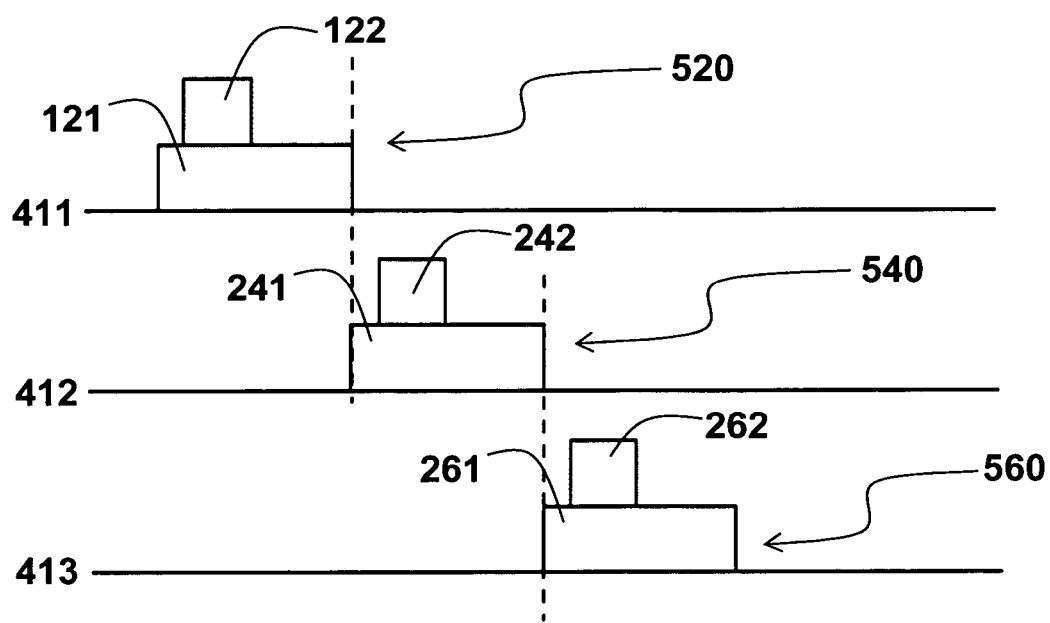
FIG. 3 illustrates schematically a possible timing of multiple second control channel signals transmitted via different carrier frequencies for serving more than a single macro cell.

FIG. 3 illustrates schematically a possible timing of multiple second control channel signals transmitted via different carrier frequencies 411, 412, 413 for serving more than a single macro cell, namely a second macro cell and a third macro cell, wherein the second macro cell uses a third control channel signal on a second carrier frequency 412 and the third macro cell uses a fifth control channel signal on a third carrier frequency 413. Alternatively to using different carrier frequencies, it is also possible in another embodiment that the first carrier frequency 411 is used for the first control channel signal and for the third control channel signal (and also for the fifth control channel signal). In a further embodiment, the femto base station sequentially broadcasts the second control channel signal 520, a fourth control channel signal 540 and a sixth control channel signal 560. The second control channel signal 520 includes the second paging channel 122, as well as the second broadcast channel 121 and is transmitted via the first carrier frequency 411 of the (first) macro cell 310. The second control channel signal 520 is a "cloned" signal of a first control channel signal 510 of the first macro cell 310 (the second control channel signal 520 being generated as described above with respect to the first or second exemplary embodiments of the present invention). The third control channel signal includes a third paging channel, as well as a third broadcast channel and is transmitted via the second carrier frequency 412 of a second macro cell (or it is transmitted on the first carrier frequency 411 of the second macro cell in case the carrier frequency of the first and second macro cell is identical), wherein the fourth control channel signal 540 is a "cloned" signal of the third control channel signal of the second macro cell (the fourth control channel signal 540 including a fourth paging channel 242 as well as a fourth broadcast channel 241) and wherein the second carrier frequency 412 may be identical or different from the carrier frequency 411 depending on the physical layer configuration of the first and the second macro cell. Correspondingly, the fifth control channel signal includes a fifth paging channel, as well as a fifth broadcast channel and is transmitted via a third carrier frequency 413 of a third macro cell (or it is transmitted on the first carrier frequency 411 of the third macro cell in case the carrier frequency of the first and third macro cell is identical), wherein the sixth control channel signal 560 is a "cloned" signal of the fifth control channel signal of the third macro cell (the sixth control channel signal 560 including a sixth paging channel 262 as well as a sixth broadcast channel 261) and wherein the third carrier frequency 413 may be identical or different from the first and second carrier frequencies 411 and 412 depending on the physical layer configuration of the first, the second and the third macro cell. The second, fourth and sixth control channel signals (520, 540, 560) are preferably broadcast sequentially in a serial order and not parallel to each other.

Transmission of the multiple "cloned" BCCHs/PCHs with pauses between subsequent transmissions has further advantages in case there is more than one carrier frequency used for macro cells or macro network 310. Then the femto base station may transmit a "cloned" BCCH/PCH on one macro carrier frequency while "cloned" BCCH/PCH transmission on the other macro carrier frequencies is paused. This reduces the peak output power of the femto base station's power amplifier, and possibly only a single transmitter is required for the transmission of the cloned signals on multiple macro frequencies.

In a further embodiment, it may be advantageous to vary the transmit power for the cloned channels. A UE receiving the original signal 510 from the macro cell 310 and the cloned signal 520 from the femto base station will combine both signals. Where both signals have similar strength, they may interfere with each other and demodulation and decoding of the information may fail. The location where a UE will experience this demodulation failure depends on the transmit powers of both macro cell 310 and femto base station. So a UE placed in a place with similar reception levels of the original and the cloned signals will in the worst case either spend too much effort on decoding attempts or not receive the paging message for the macro network 310 at all. If the femto base station varies the transmit power for the cloned signals, the location of demodulation failure will move accordingly, and a UE at a static location will not be affected permanently by the demodulation failure.

The invention claimed is:

1. A method for channel modification within a macro cell of a cellular mobile radio access network, the method comprising the steps of:
   providing a first control channel signal transmitted by a first transmitter on a broadcast channel, wherein the macro cell comprises the first transmitter and the macro cell overlaps at least partly with a radio coverage area created by a second transmitter; and
   providing a second control channel signal transmitted by the second transmitter on the same broadcast channel as the first control channel signal, wherein the second control channel signal is transmitted using a same physical layer configuration as the first control channel signal;
   wherein the second control channel signal is synchronized to the first control channel signal, wherein the second control channel signal includes a duplication of the first control channel signal, and wherein the second control channel signal differs from the first control channel signal in at least one information element carried by the first control channel signal.

2. The method according to claim 1, wherein the mobile radio access network is a UNITS (Universal Mobile Telecommunications System) or an LIE (Long Term Evolution) mobile radio access network.

3. The method according to claim 1, wherein the physical layer configuration by which the second control channel signal and the first control signal are transmitted utilize the same frequency, scrambling codes, and channelization codes.

4. The method according to claim 1, wherein the at least one information element comprises a value of a Sintersearch Radio Resource Control parameter carried on the broadcast channel.

5. The method according to claim 4, wherein the value of the Sintersearch Radio Resource Control parameter of the second control channel signal is increased compared to the first control channel signal.

6. The method according to claim 1, wherein the at least one information element comprises a Paging Type 1 message with information that the broadcast control channel is modified.

7. The method according to claim 1, wherein the at least one information element comprises a macro cell identity information different from a macro cell identity information of the macro cell carried by the broadcast channel.

8. The method according to claim 1, wherein the transmission of the second control channel signal is at least one of temporarily interrupted and repeatedly interrupted.

9. The method according to claim 1, wherein, for the transmission of the second control channel signal, a first carrier frequency is used and for the transmission of another control channel signal, a second carrier frequency is used.

10. The method according to claim 9, wherein the second control channel signal and the another control channel signal are broadcast sequentially.

11. The method according to claim 1, wherein for the transmission of the second control channel signal a first carrier frequency is used and, for the transmission of another control channel signal, the first carrier frequency is also used.

12. The method according to claim 1, where transmission power of the second transmitter is varied over time.

13. A base station for a radio coverage area, configured to be operably coupled to a macro cell of a mobile radio access network, wherein the macro cell comprises a first transmitter for transmitting a first control channel signal on a broadcast channel, the base station comprising:
  a second transmitter configured to create a radio coverage area, wherein the macro cell overlaps at least partly with the radio coverage area created by a second transmitter, and configured to transmit, on the same broadcast channel as the first control signal, a second control channel signal using the same physical layer configuration as the first control channel signal, wherein the second control channel signal is generated by the base station;
  wherein the second control channel signal is synchronized to the first control channel signal, wherein the second control channel signal includes a duplication of the first control channel signal, and wherein the second control channel signal differs from the first control channel signal in at least one information element carried by the first control channel signal.

14. The base station according to claim 13, wherein the mobile radio access network is a UMTS (Universal Mobile Telecommunications System) or an LTE (Long Term Evolution) mobile radio access network.

15. The base station according to claim 13, wherein the physical layer configuration by which the second control channel signal and the first control signal are transmitted utilize the same frequency, scrambling codes, and channelization codes.

16. A tangible, non-transient computer-readable medium having computer-executable instructions for controlling a base station for a radio coverage area configured to be operably coupled to a macro cell of a mobile radio access network stored thereon, wherein the macro cell has a first transmitter for transmitting a first control channel signal on a broadcast channel and the macro cell overlaps at least partly with the radio coverage area, the radio coverage area being created by a second transmitter, the computer-executable instructions, when executed by a processor, causing the processor to perform the steps of:
  generating a second control channel signal; and
  transmitting, on the same broadcast channel as the first control channel signal, the second control channel signal using the same physical layer configuration as the first control channel signal;
  wherein the second control channel signal is synchronized to the first control channel signal, wherein the second control channel signal includes a duplication of the first control channel signal, and wherein the second control channel signal differs from the first control channel signal in at least one information element carried by the first control channel signal.

17. The tangible, non-transient computer-readable medium according to claim 16, wherein the mobile radio access network is a UMTS (Universal Mobile Telecommunications System) or an LIE (Long Term Evolution) mobile radio access network.

18. The tangible, non-transient computer-readable medium according to claim 16, wherein the physical layer configuration by which the second control channel signal and the first control signal are transmitted utilize the same frequency, scrambling codes, and channelization codes.

19. The tangible, non-transient computer-readable medium according to claim 16, wherein the tangible, non-transient computer-readable medium is part of a computer program product.

* * * * *